United States Patent [19]

Hardam et al.

[11] Patent Number: 4,810,624

[45] Date of Patent: Mar. 7, 1989

[54] PHOTOGRAPHIC ELEMENT WITH ANTISTATIC POLYMERS

[75] Inventors: William M. Hardam; Frank L. Schadt, III, both of Wilmington; Arthur J. Taggi, Hockessin, all of Del.

[73] Assignee: E. I. DuPont de Nemours and Company, Wilmington, Del.

[21] Appl. No.: 92,385

[22] Filed: Sep. 2, 1987

Related U.S. Application Data

[60] Continuation-in-part of Ser. No. 874,158, Jun. 13, 1986, abandoned, which is a division of Ser. No. 663,662, Oct. 19, 1984, Pat. No. 4,668,748.

[51] Int. Cl.[4] .............................................. G03C 1/82
[52] U.S. Cl. .................................... 430/528; 430/527; 430/530; 430/534

[58] Field of Search ....................... 430/528, 529, 530

[56] References Cited

U.S. PATENT DOCUMENTS

| | | | |
|---|---|---|---|
| 4,225,665 | 9/1980 | Schadt, III | 430/529 |
| 4,525,562 | 6/1985 | Patel | 526/271 |
| 4,552,835 | 11/1985 | Nakamura et al. | 430/523 |

*Primary Examiner*—Christopher Henderson

[57] ABSTRACT

To protect photographic films from imaging by static discharges during manufacturing and customer use, copolymers of sulfonated monomers and primary amine monomers are coated on a film base and crosslinked with an aldehyde such as glutaraldehyde, or other colloid hardener giving a water-resistant, permanent, conductive (i.e., antistatic) layer.

26 Claims, No Drawings

PHOTOGRAPHIC ELEMENT WITH ANTISTATIC POLYMERS

CROSS REFERENCE TO RELATED APPLICATIONS

This is a continuation-in-part of Ser. No. 874,158 filed June 13, 1986 now abandoned, which is a division of Ser. No. 663,662, filed Oct. 19, 1984, now U.S. Pat. No. 4,668,748.

FIELD OF THE INVENTION

This invention relates to crosslinkable antistatic polymers and their use in silver halide photographic films. These polymers, when crosslinked with an aldehyde or other crosslinking agent, give water-resistant, conductive film layers.

STATE OF THE ART

Himmelmann et al., U.S. Pat. No. 3,168,403, "Flocculated Gelatine Emulsions Containing Sulphonated Copolymers of Styrene", discloses a process for the production of a photographic emulsion which comprises coagulating (i) a dispersion of light-sensitive silver halide particles in an aqueous solution of gelatin by the addition thereof of (ii) an aqueous solution of a water-soluble salt of a sulfonated copolymer of styrene and a monomer of the group consisting of acrylic and methacrylic acids, esters of acrylic and methacrylic acids with aliphatic alcohols, acrylamide and methacrylamide, acrylonitrile and methacrylonitrile, and vinylpyrrolidone. The sulfonated copolymer contains between 15 and 60 percent by weight of sulfo radicals and is formed by sulfonation of a copolymerized mixture consisting of between 70 and 97 percent by weight of styrene and between 3 and 30 percent by weight of one of the other specified monomers, followed by separating the coagulum from the mixture, washing it with water, and redispersing it in another aqueous solution of gelatin.

Otteson et al., U.S. Pat. No. 4,178,422, is directed to a copolymer comprising a plurality of ethylsulfonate and 2 to 6 carbon atom lower alkylamine groups, the sum of the number of ethylsulfonate groups and lower alkylamine groups being from 20 to 3000 and the number of lower alkylamine groups being from 0.4 to 2.5 times the number of ethylsulfonate groups.

Schadt, III, U.S. Pat. No. 4,225,665 is directed to antistatic compositions suitable for polymeric materials which are useful as permanent antistatic layers for photographic elements and films. The permanent antistatic layers of Schadt, III consist essentially of three primary components: (1) a water-soluble, electrically conductive polymer having functionally attached carboxyl groups integral to the polymer, e..g, copolymer of a salt of styrene sulfonic acid and a monomer having functionally attached carboxyl groups such as maleic acid; (2) a hydrophobic polymer containing carboxyl groups, e.g., anionic copolymer of methacrylic acid and one or more monomers selected from the group consisting of alkyl acrylates, styrene, acrylonitrile and alkyl methacrylates; and (3) a polyfunctional aziridine. In this crosslinked antistatic layer, the hydrophobic component (2) applied to the support from a water dispersion, assists in making the layer not readily dissolved in, or swollen by, water. As shown in Schadt, III column 8, line 46 to column 9, line 44 coatings similar to Schadt, III except for available carboxylic groups did not give clear coatings and did not survive photographic processing.

It is desired to provide copolymers containing essentially no free carboxyl groups which are crosslinkable with crosslinking agents, and which provide antistatic properties when present as an auxiliary layer either as a backing layer on the side of a support opposite a photosensitive layer or a subcoat layer.

SUMMARY OF THE INVENTION

In accordance with this invention there is provided a conductive, water-soluble, hydrophilic copolymer having monomer units consisting essentially of (a) a $-SO_3M$ substituted ethylenically unsaturated monomer where M is $H^+$, $NH_4^+$, metal$^+$ or $N(R)_4^+$, where R is an alkyl group having 1–6 carbon atoms or an aryl group, and (b) an ethylenically unsaturated comonomer containing a primary or secondary amino group, the molar ratio of (a) to (b) being 99:1 to 15:85, and optionally, (c) another ethylenically unsaturated monomer containing essentially no free carboxyl groups, crosslinked with a member selected from the group consisting of mono- and polyfunctional aldehydes, bisvinyl sulfones, polyfunctional aziridines, symmetrical triazines and diazines, α-diketones, active halogen compounds, epoxides, active olefins having two or more active bonds, blocked active olefins, halogen-substituted aldehyde acids and dialdehyde starches, and combinations thereof.

In accordance with an embodiment of this invention there is provided a crosslinked antistatic polymer prepared by reacting a copolymer taken from the group consisting of a copolymer of a styrene sulfonate and vinyl amine ($H_2C=CH-NH_2$) having the formula

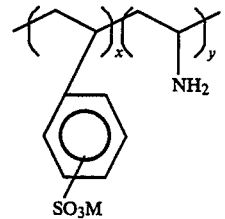

where x is 15–99% and y=85–1%, and M=$H^+$, $NH_4^+$, metal$^+$ or $N(R)_4^+$ where R is an alkyl group having 1–6 carbon atoms or an aryl group, and a copolymer of 1 to 85% 2-(amino)ethyl methacrylate or acrylate and 99–15% a styrenesulfonate (M as above), these percentages being molar, with a crosslinking agent for gelatin selected from the group consisting of mono- and polyfunctional aldehydes, bisvinyl sulfones, symmetrical triazines and diazines, polyfunctional aziridines, α-diketones, active halogen compounds, epoxides, active olefins having two or more active bonds, blocks active olefins, halogen-substituted aldehyde acids and dialdehyde starches, and combinations thereof.

In accordance with another embodiment of this invention there is provided a photographic element comprising a support, a photosensitive layer on at least one side of the support, and an auxiliary layer, wherein said auxiliary layer is a layer selected from the group consisting of a backing layer on the side of the support opposite the photosensitive layer, and a subcoat layer, and comprises a conductive, crosslinkable, water-soluble, hydrophilic copolymer having monomer units consisting essentially of (a) a SO$_3$M substituted ethylenically unsaturated monomer where M is H$^+$, NH$_3^+$, metal$^+$, or N(R)$_4^+$, where R is an alkyl group having 1-6 carbon atoms or an aryl group, and (b) an ethylenically unsaturated comonomer containing a primary or secondary amino group selected from the group consisting of

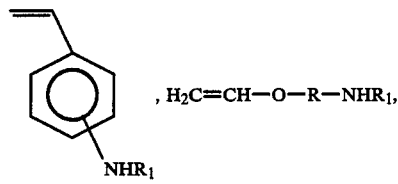, H$_2$C=CH—O—R—NHR$_1$,

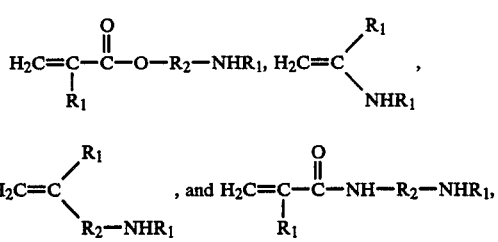

or acid salts thereof, where R is phenyl or alkyl of 1-4 carbon atoms, R$_2$ is phenyl or alkyl of 1-12 carbon atoms, the molar ratio of (a) to (b) being 99:1 to 15:85, and optionally (c) another ethylenically unsaturated monomer containing essentially no free carboxyl groups, said copolymer crosslinked with a member selected from the group consisting of mono and polyfunctional aldehydes, bisvinyl sulfones, polyfunctional aziridines, symmetrical triazines and diazines, α-diketones, active halogen compounds, epoxides, active olefins having two or more active bonds, blocked active olefins, halogen-substituted aldehyde acids and dialdehyde starches, and combinations thereof.

In accordance with yet another embodiment of this invention there is provided a process of applying a coating to a film support wherein the coating comprises an antistatic polymer and a crosslinking agent dissolved or dispersed in an aqueous solution, and wherein the resulting coating is dried and heated to effect crosslinking, characterized in that the antistatic polymer is a copolymer having monomer units consisting essentially of (a) a —SO$_3$M substituted ethylenically unsaturated monomer where M is H$^+$, NH$_4^+$, metal$^+$ or N(R)$_4^+$, where R is an alkyl group having 1-6 carbon atoms or an aryl group, and (b) an ethylenically unsaturated comonomer containing a primary or secondary amino group, and optionally (c) another ethylenically unsaturated monomer containing essentially no free carboxyl groups.

The conductive, crosslinkable, water-soluble, hydrophilic copolymer which has essentially no free carboxyl groups can be prepared from or contains or has two or three monomeric units present. For example, monomer (a) may be

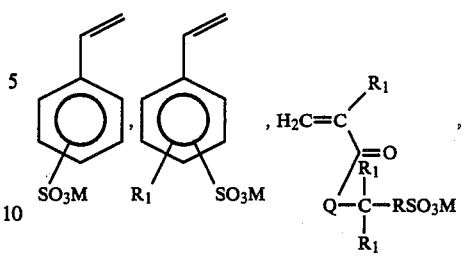

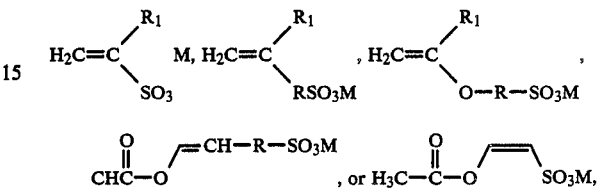

where R=phenyl or an alkyl group of 1-6 carbon atoms, R$_1$=H or alkyl of 1-6 carbon atoms, Q=NR$_1$ or O, and M is H$^+$, NH$_4^+$, N(R)$_4^+$ or metal$^+$ such as Li$^+$, NA$^+$, K$^+$. Monomer (b) may be

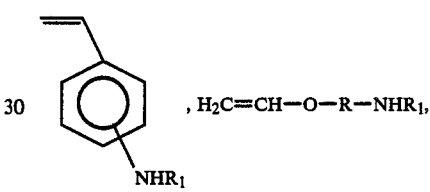, H$_2$C=CH—O—R—NHR$_1$,

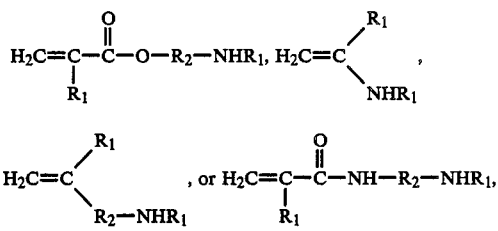

or acid salts thereof, where R=phenyl or alkyl of 1-4 carbon atoms. R$_1$=H or alkyl of 1-6 carbon atoms, and R$_2$=phenyl or a C$_1$-C$_{12}$ alkyl group.

Monomer (c) which contains essentially no free carboxyl groups may be

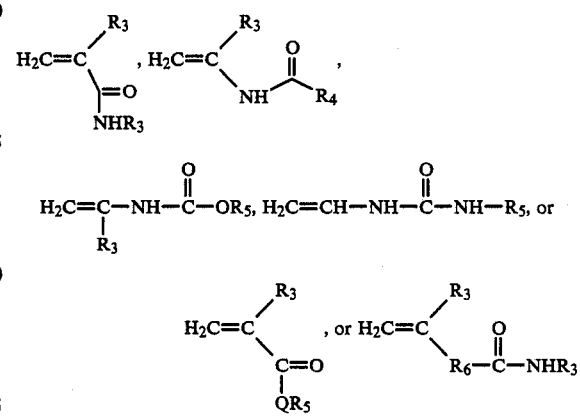

where R$_3$=H or alkyl of 1-6 carbons, R$_4$=H or a C$_1$-C$_{12}$ alkyl group, R$_5$=alkyl of 1-12 carbon atoms, $Q = NR_3$ or $O$, and $R_6$ = phenyl or $C_1$-$C_{12}$ alkyl group. The presence of monomer unit (c) in the copolymer is primarily due to monomer used to prepare the free amine substituent that remains unblocked after polymerization (b), although other units may be a side product or specifically added.

Some of these polymers may be synthesized by, for example, the reaction of a sodium styrenesulfonate/acrylamide copolymer with caustic and sodium hypochlorite.

In one embodiment the invention is directed to copolymers having the general formula

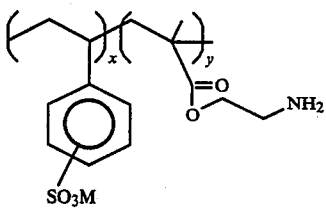

where
y - 1-85%,
x - 99-15%, and
$M = H^+$, $NH_4^+$, $N(R_4^+$ where $R$ = a $C_1$-$C_6$ alkyl group or aryl, and metal+ such as $Li^+$, $Na^+$, $K^+$. When these copolymers are coated on a film base and crosslinked with an aldehyde such as glutaraldehyde, they form a water-resistant permanent, conductive (i.e., antistatic) layer. Further, these layers reduce dust pick-up, and sticking of film layers together. More particularly, this invention relates to polymers which can be used in overcoat, backing or subbing layers of photographic films to reduce fog formed by static discharges during manufacturing and customer use.

In a specific embodiment, the invention is directed to a photographic film comprising a support, a photosensitive gelatino-silver halide emulsion layer on at least one side of said support, and a water-resistant antistatic auxiliary layer which comprises the crosslinked form of the polymer defined above. This auxiliary layer may be present as a backing layer on said support, thus on the side opposite the only side containing a photosensitive layer, or as a subbing layer between the support and the emulsion layer or a different backing layer (can be overcoated with an antihalation layer, for example). These antistatic layers are also useful in photopolymerizable elements to reduce dust pick-up and sticking of adjacent layers.

DETAILED DESCRIPTION OF THE INVENTION

The improved antistatic polymers of this invention are crosslinkable conductive polymers for use as antistats in graphic arts film subs (subcoatings), overcoats, or backing layers and medical x-ray film subs, overcoats or backing layers.

The antistatic layer of the present invention may also contain addenda which do not degrade the antistatic properties. Typical are matting agents, plasticizers, lubricants, surfactants, dyes, and haze reducing agents.

For the preferred antistatic copolymer, the ratio of sodium salt of styrenesulfonic acid to amine-containing monomer is 95:5 (molar). Other antistatic copolymer molar ratios of from 99:1 to 15:85 will give the desired antistatic protection of the present invention. Thus, while increasing the portion of the copolymer containing the ionic electrically conductive sulfonates will lower the amount needed to be added to the aqueous coating composition, the availability of crosslinking sites is correspondingly reduced. Also, as the proportion of the amine-containing monomer increases, the cost of the polymer increases and intramolecular crosslinking increases.

The aqueous coating composition may be applied to any suitable photographic support, but the preferred support is a poly(ethylene terephthalate) film which has been subcoated with a layer of resin, or layers of resin and gelatin.

Suitable coating weight based on the dry weight of the composition can range from 0.25 to 100 mg/dm². Too low a coating weight does not provide adequate permanent antistatic protection. Too high a coating weight increases cost.

A backing layer is the preferred location for the antistatic composition of the present invention when used for photographic films or rolls. However, other specific applications may require that antistatic protection be provided above or beneath another layer, or beneath a photosensitive layer When used in conjunction with other photosensitive and auxiliary layers it may be necessary to have intermediate layers to provide compatibility and provide sufficient adhesion to adjacent layers.

The photosensitive and/or radiation sensitive layers useful with the present invention may be any which are well-known for imaging and reproduction in fields such as graphic arts, printing, medical, and information systems. Photopolymer, diazo, vesicular image-forming compositions, and electrostatic systems may be used in addition to silver halide. Photographic silver halide emulsions which may be present on one or both sides of the support may be of varied content and be negative or positive working, and may be coated on film base from solutions optionally containing a gelatin binder and crosslinked to give water insoluble layers. Two or more binders having low conductivity may be used. Other binders include polyvinyl alcohol, acrylic acid, and acrylic acid/ester type water soluble or dispersible compounds. These binders may also be added to subs, overcoats, or backing layers comprising the antistatic polymers of the invention.

Prior to being applied to the surface to be protected, the antistatic polymer and the crosslinking agent are dissolved in an aqueous solution. Addition of the crosslinking agent should be delayed until shortly before coating since some reaction can occur in the aqueous composition, particularly if held for many hours. Surfactants may also be added to facilitate solution or dispersion preparation, or as a coating aid. Some useful surfactants are sodium laurylsulfonate, dioctyl sodium sulfosuccinate, sodium octylphenylpolyethersulfonate, other sodium alkyl aryl polyether sulfonates, and saponin.

After this composition is coated on the support, the critical crosslinking occurs during the drying, curing, and aging of the layer, thereby transforming this composition into its useful form as a permanent antistatic layer which is both water-resistant and transparent. Air temperatures of from 20° C. to 200° C. are useful for the drying-curing step, while the preferred range is 38° C. to 100° C.

It is preferable to apply, and dry-cure, the antistatic layer during the manufacture of the polyester support as taught by Alles in U.S. Pat. No. 2,799,684, and to apply a resin subbing layer such as the mixed-polymer subbing compositions of vinylidene chloride-itaconic acid, taught by Rawlins in U.S. Pat. No. 3,567,452, prior to the application of the antistatic layer. When poly(ethylene terephthalate) is manufactured for use as a photographic support, the polymer is cast as a film, the mixed polymer subbing composition of Rawlins is applied, and the structure is then biaxially stretched, followed by application of a gelatin subbing layer. Upon completion of stretching and the application of subbing compositions, it is necessary to remove strain and tension in the base by a heat treatment comparable to the annealing of glass. Air temperatures of from 100° C. to 160° C. are typically used for this heat treatment, which is referred to as the post-stretch heat relax. If desired, one or both of the gelatin subbing layers on either side of the film could be replaced by the formulation of the present invention, serving a dual purpose and resulting in an increase in productivity and economy. Optionally, the antistatic layer may be coated after the gelatin subbing layer is applied and then optionally before or after it is heat relaxed.

Crosslinking agents useful in the invention are those which are known to crosslink or harden gelatin, such as mono and polyfunctional aldehydes, e.g., formaldehyde and free dialdehydes, such as succinaldehyde and glutaraldehyde, as illustrated by Allen et al. U.S. Pat. No. 3,232,764; blocked dialdehydes, as illustrated by Kaszuba U.S. Pat. No. 2,586,168, Jeffreys U.S. Pat. No. 2,870,013, and Yamamoto et al. U.S. Pat. No. 3,819,608; α-diketones, as illustrated by Allen et al. U.S. Pat. No. 2,725,305: active esters of the type described by Burness et al. U.S. Pat. No. 3,542,558; active halogen compounds as illustrated by Burness U.S. Pat. No. 3,106,468, Silverman et al. U.S. Pat. No. 3,839,042, Ballantine et al. U.S. Pat. No. 3,951,940 and Himmelmann et al. U.S. Pat. No. 3,174,861; s-triazines and diazines, as illustrated by Yamamoto et al. U.S. Pat. No. 3,325,287, Anderau et al. U.S. Pat. No. 3,288,775 and Stauner et al. U.S. Pat. No. 3,992,366; epoxides, as illustrated by Allen et al. U.S. Pat. No. 3,047,394, Burness U.S. Pat. No. 3,189,459 and Birr et al. German Pat. No. 1,085,663; aziridines, as illustrated by Allen et al. U.S. Pat. No. 2,950,197, Burness et al. U.S. Pat. No. 3,271,175 and Sato et al. U.S. Pat. No. 3,575,705; active olefins having two or more active bonds, as illustrated by Burness et al. U.S. Pats. Nos. 3,490,911, 3,539,644 and U.S. Pat. No. 3,841,872 (U.S. Pat. No. Re. 29,305), Cohen U.S. Pat. No. 3,640,720, Kleist et al. German Pat. No. 872,153 and Allen U.S. Pat. No. 2,992,109; blocked active olefins, as illustrated by Burness et al. U.S. Pat. No. 3,360,372 and Wilson U.S. Pat. No. 3,345,177; hardeners of mixed function, such as halogen-substituted aldehyde acids (e.g., mucochloric and mucobromic acids), as illustrated by White U.S. Pat. No. 2,080,019, vinyl sulfones containing other hardening functional groups, as illustrated by Sera et al. U.S. Pat. No. 4,028,320; and polymeric hardeners, such as dialdehyde starches, as illustrated by Jeffreys et al. U.S. Pat. No. 3,057,723, and copoly(acrolein-methacrylic acid), as illustrated by Himmelmann et al. U.S. Pat. No. 3,396,029. Some useful polyfunctional aziridines are listed below: Pentaerythritol-tri[β-(N-aziridinyl)propionate]:

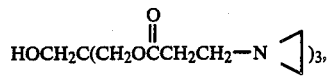

Trimethylolpropane-tri[β-(N-aziridinyl)propionate]:

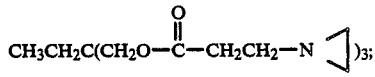

and trimethylolpropane-tri[β-(N-(methylaziridinyl))propionate]

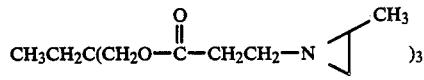

Other polyfunctional aziridines can be employed, e.g., pentaerythritol-tri[β-(N-(alkyl or dialkyl-substituted aziridinyl))propionate]wherein alkyl is of 1 to 6, preferably 1 to 4, carbon atoms.

Some conductive crosslinkable polymers useful in this invention are copolymers of sodium styrenesulfonate and vinyl amine. These copolymers may be synthesized by the Hofmann reaction wherein a sodium styrenesulfonate/acrylamide copolymer is reacted with caustic and sodium hypochlorite. Alternatively, the sodium styrenesulfonate/vinyl amine copolymers could be manufactured by copolymerizing sodium styrenesulfonate and vinyl acetamide monomer. Hydrolysis of the acetamide function would unmask the amine group. Vinyl acetamide is commercially available but expensive, however, thus increasing the expense of this route.

In a specific embodiment, a sodium styrene sulfonate/vinyl amine copolymer may be prepared by solution copolymerizing the sodium styrenesulfonate and acrylamide in water, followed by the direct reaction of the aqueous solution with caustic and sodium hypochlorite. Some useful caustic materials are sodium hydroxide, or potassium hydroxide. A common household bleach solution of sodium hypochlorite, such as Clorox ®, may be used.

Some other crosslinkable conductive copolymers useful in forming water-resistant, permanent, conductive layers are sodium styrenesulfonate-2-(amino)alkyl methacrylate, e.g., sodium styrenesulfonate-2-(amino)ethyl methacrylate; and sodium 2-acrylamido-2-methylpropanesulfonate-vinyl amine, as well as potassium or ammonium salts of the above.

The following examples serve to illustrate the practice of the invention, wherein surface resistivity measurements were made using the following procedure:

Two 3.5"×3.5" (8.89 cm×8.89 cm) samples of a subbed (subcoated) poly(ethylene terephthalate) base coated with the antistatic layer were allowed to equilibrate overnight in a 25–30% controlled relative humidity box containing the surface resistivity measurement equipment. Each sample was then placed as symmetrically as possible, coated side down, in a Keithley Model 6105 Resistivity Adapter. The sample was covered with the grounded weight as symmetrically as possible. The resistivity adapter was then closed. After 15 seconds, an offset current was read on a Keithley Model 616 Digital Electrometer. A high voltage, either 600 or 1200 volts, supplied by a Keithley Model 240A High Voltage Supply was switched on. Current was read on the electrometer after 30 seconds.

Surface resistivity (ρs) is calculated from the following:

$$\rho s = \frac{KV}{I - I_o}$$

where
K = electrode constant = 53.36
V = Bias voltage
I = Current
$I_o$ = Offset current.

EXAMPLES

Example 1

A solution of 90 g of sodium styrene sulfonate and 3.4 grams of acrylamide in 400 ml of water was prepared in a mechanically stirred flask. The solution was nitrogen-sparged for 1 hour, and then heated to 45° C. 30 ml of 1N sulfuric acid, 25 ml of 0.1% ferrous ammonium sulfate hexahydrate, 25 ml of 10% sodium metabisulfite and 20 ml of 2% potassium persulfate were added in the order listed. After quickly heating to 65° C. the reacts were stirred at 65° C. for 4 hours. The solution was then cooled to approximately 20° C. and poured into 2 liters of acetone. After decanting, methanol was added and the mixture allowed to stand for 2 days. The solids were broken-up, and after filtering they were washed with methanol, air dried, and then vacuum oven dried at 60° C. to give a sodium styrene sulfonate/acrylamide (9/1) copolymer.

This was converted to the corresponding sodium styrenesulfonate/vinyl amine copolymer by the following procedure:

19.3 grams of the pulverized acrylamidecontaining copolymer and 90 ml of water were placed in a magnetically stirred flask and heated to 65° C. until all the polymer was dissolved. The solution was then cooled in an ice/acetone bath maintained at temperatures of −2 to 0° C. during the additions to follow. 9.2 ml of 12M sodium hydroxide were added, followed by 14 ml of Clorox ®, and a mixture of 46 ml of a solution of 12M sodium hydroxide and 46 ml of water which were added slowly. The mixture was stirred for 2 hours in an ice bath, held overnight at room temperature, and poured into 2 liters of methanol. It was then stirred, filtered, washed with more methanol, and vacuum oven dried at 60° C. to give 19 grams of a white powder.

Example 2

A solution of 30 grams of sodium styrenesulfonate and 7 grams of acrylamide in 200 ml of water was $N_2$ sparged for 30 minutes. After heating to 45° C., and adjusting the pH to 3.5 by addition of dilute acid, 12 ml of ferrous ammonium sulfate, 8 ml of 10% sodium metabisulfite, and 10 ml of 2%, potassium persulfate were added in the order listed. The reaction mixture was heated to 65° C., held for 4 hours, cooled to approximately 30° C., and poured into 2.5 liters of acetone. The acetone was decanted off, and methanol was added. After filtration, the copolymer was methanol-washed, and vacuum oven-dried at 60° C. to give 29 grams of a sodium styrenesulfonate/acrylamide (3/2) copolymer. This was converted to the corresponding amine-containing copolymer by the following procedure.

18 grams of copolymer and 90 ml of water were warmed to 65° C. to dissolve all the copolymer. The resulting mixture was cooled to 0° C., and 9 ml of 12M NaOH were added, causing a temperature rise. The solution was again cooled to approximately 0° C., and 28 ml of Clorox ® were added, followed by 46 ml of 12M NaOH which were added slowly, keeping the temperature at 0°–5° C. The resulting mixture was stirred for 2 hours in an ice bath, then for another 2 hours at room temperature, and was poured into 1 liter of methanol. A white precipitate was obtained. This was filtered, methanol-washed, and vacuum oven-dried at 60° C. to yield ca. 17 grams of a white solid.

Example 3

A sodium styrenesulfonate/acrylamide (4/1) copolymer was prepared and converted to the corresponding vinyl amine copolymer by the following procedure:

A solution of 40 g of sodium styrenesulfonate and 3.4 g of acrylamide in 200 ml water was $N_2$ sparged for ½ hour while heating to 60° C. 15 ml of 1N $H_2SO_4$, 13 ml of 0.1% (w/v) ferrous ammonium sulfate, 8 ml of 10% (w/v) sodium bisulfite, and 10 ml of 2% (w/v) potassium persulfate were added. The mixture was heated to 65° C. and held for 4 hours, with stirring and $N_2$ sparging.

The mixture was cooled to 0° C., and sodium hydroxide (21 ml of a 12M solution) was added. The mixture was cooled in an ice/acetone bath to T≦1° C. while 103 ml of a 12M NaOH solution was added. The mixture was stirred for 2 hours in an ice bath. Product was isolated by pouring the reaction mixture into 2 liters of methanol, followed by filtration and methanol-washing. Vacuum oven drying gave ca. 43 g (98% of theoretical) sodium styrenesulfonate/vinyl amine copolymer.

Example 4

A solution of 41 g of 2-acrylamido-2-methyl-propane sulfonic acid in 200 ml of water was prepared. The pH was adjusted to 9 with 12M NaOH. 4 g of acrylamide was added. The solution was $N_2$ sparged for 1 hour. The reaction flask was placed in a 40° C. water bath, potassium persulfate (3.4 ml of 2% solution) was added; the mixture was maintained at 40° C. The solution rapidly became very viscous. After 4 hours the solution was poured into acetone, the acetone was decanted, and the product was allowed to stand overnight with fresh acetone. The resulting rubbery lump was broken up in a blender with fresh acetone, was filtered, and acetone-washed, and was vacuum oven-dried to give 39 g of sodium 2-acrylamido2-methylpropanesulfonate (Na AMPS)/acrylamide copolymer, which is a white solid.

18 g of Na AMPS/acrylamide copolymer was dissolved in 90 ml of water. The solution was cooled to 0° C. and 9 ml of 12M NaOH were added. The mixture was cooled to approximately 0° C. in an ice/acetone bath, and 28 ml of Clorox ® were added, followed by 46 ml of 12M sodium hydroxide. The mixture was stirred for 2 hours at ice temperature, and then at room temperature overnight. The solution was poured into acetone, the liquid was decanted, and fresh acetone was added. Product was collected on a funnel and was acetone-washed. Vacuum oven drying gave a white solid which is a sodium AMPS/vinyl amine copolymer AMPS is the registered trademark of Lubrizol Company, Wickliffe, Ohio.

Example 5

A solution of 35 g of sodium styrenesulfonate and 14 g of 35% 2-(amino)ethylmethacrylate.HCl solution in 200 ml of water was prepared. The pH was adjusted to 3.5 using 1N sulfuric acid, and 0.1 g disodium ethylenediamine tetraacetate was added to the above solution. The solution was then $N_2$ sparged for 30 minutes and heated to 65° C. 3 g of 4,4'-azobis(4-cyanovaleric acid) were then added, and the solution maintained at 65° C. for 6 hours. The reactants were poured into 1 liter of acetone, the acetone was decanted off, and methanol added. This mixture was allowed to stand overnight, followed by filtration and methanol-washing. Vacuum oven drying gave 40 g of a 11% 2-(amino)ethyl methacrylate/sodium styrenesulfonate copolymer, a white solid.

Example 6

8 grams of a sodium styrenesulfonate/vinyl amine copolymer prepared as described in Example 2 from a sodium styrenesulfonate/acrylamide (3/2) copolymer were dissolved in water. To this solution was added 6 ml of a solution containing sodium-p-tert-octylphenoxypolyethoxyethylsulfonate and the pH was adjusted to 5. The solution was then diluted to 200 ml. Eight 20 ml aliquots were removed, and to each was added varying amounts of hardener as listed in Table 1. The hardener additions were made just prior to coating. A 0.001 inch (0.00254 cm) (wet thickness) coating of each solution was then made with a doctor knife on a poly(ethylene terephthalate) base, subbed as described in Example 1 of Rawlins, U.S. Pat. No. 3,567,452. The coatings were dried at 150° F. for 5 minutes and then air dried overnight to give very clear films. Two squares were cut from each coating, equilibrated in a constant humidity (25–30% RH) box, and the surface resistivity was measured. One sample of each pair was soaked in water for 15 minutes at room temperature and air dried. Both coatings of each pair were then returned to the constant humidity box, and equilibrated overnight. All coatings were read again and results are shown in Table 1. The uncoated subbed poly(ethylene terephthalate) base described above served as the control.

TABLE 1

| Coating | | Hardener | Amount Hardener (ml) | Surface Resistivity ($\rho s$) OHMS | Surface Resistivity ($\rho s$) OHMS, #1 Coating Only $H_2O$ Soaked |
|---|---|---|---|---|---|
| A | 1 | Glutaraldehyde (25% soln. in water) | 0.78 | $4.2 \times 10^9$ | $9.2 \times 10^9$ |
| | 2 | | | $4.4 \times 10^9$ | $4.8 \times 10^9$ |
| B | 1 | Glutaraldehyde (25% soln. in water) | 0.39 | $7.3 \times 10^9$ | $7.2 \times 10^{11}$ |
| | 2 | | | $4.7 \times 10^9$ | $4.7 \times 10^9$ |
| C | 1 | Glutaraldehyde (25% soln. in water) | 0.20 | $4.1 \times 10^9$ | $4.1 \times 10^9$ |
| | 2 | | | $3.9 \times 10^9$ | $4.8 \times 10^9$ |
| D | 1 | Glutaraldehyde | 0.10 | $4.7 \times 10^9$ | $1.4 \times 10^{15}$ |
| | 2 | | | $4.3 \times 10^9$ | $4.8 \times 10^9$ |
| E | 1 | Formaldehyde (37% soln. in water) | 0.53 | $4.1 \times 10^9$ | $3.8 \times 10^{15}$ |
| | 2 | | | $4.3 \times 10^9$ | $5.4 \times 10^9$ |
| F | 1 | Formaldehyde (37% soln. in water) | 0.26 | $5.2 \times 10^9$ | $2.9 \times 10^{15}$ |
| | 2 | | | $4.3 \times 10^9$ | $6.3 \times 10^9$ |
| G | 1 | Formaldehyde (37% soln. in water) | 0.13 | $2.5 \times 10^9$ | $2.0 \times 10^{16}$ |
| | 2 | | | $2.7 \times 10^9$ | $4.9 \times 10^9$ |
| H | 1 | Formaldehyde (37% soln. in water) | 0.07 | $3.2 \times 10^9$ | $5.6 \times 10^{15}$ |
| | 2 | | | $3.8 \times 10^9$ | $5.8 \times 10^9$ |
| Control | | | | $8.3 \times 10^{15}$ | — |
| | | | | $8.0 \times 10^{16}$ | — |

The results show glutaraldehyde hardens films at concentrations $\geq 6\%$ by weight of the polymer (i.e., coatings A, B & C). Lower concentrations of glutaraldehyde lead to insufficient hardening and wash-off.

Example 7

4 gms of sodium styrenesulfonate/vinyl amine copolymer prepared as in Example 1 were dissolved in water. The pH was adjusted to 5 with dilute acid and the solution was diluted to 100 ml. 3 ml of a solution containing sodium-p-tert-octylphenoxypolyethoxyethylsulfonate were added to this solution. Four 20 ml aliquots were taken, and to each amounts of glutaradehyde hardener (25% solution in water) indicated in Table 2 were added. The hardener addition was made just prior to coating. A 1 mil coating of each solution was made on a poly(ethylene terephthalate) base, subbed as described in Example 6. The coatings were dried in a forced air tunnel drier at 150°–155° F. for 5 minutes, and then air dried overnight. Two squares were cut from each coating, and placed in a controlled humidity (25–30% RH) box overnight, and the resistivity of the films was determined. One film of each set was immersed in water for 15 minutes and then air dried. Both samples of each set were then returned to the constant humidity box and equilibrated overnight. All coatings were then read again and results are shown in Table 2.

TABLE 2

| Coating | | Amount Hardener (ml) | Surface Resistivity ($\rho s$) OHMS | Surface Resistivity ($\rho s$) OHMS #1 Ctgs. Only Water Soaked |
|---|---|---|---|---|
| A | 1 | 0.78 | $7.8 \times 10^8$ | $2.6 \times 10^{11}$ |
| | 2 | | $9.4 \times 10^8$ | $1.8 \times 10^{10}$ |
| B | 1 | 0.39 | $8.0 \times 10^8$ | $1.1 \times 10^{13}$ |
| | 2 | | $8.3 \times 10^8$ | $2.1 \times 10^{10}$ |
| C | 1 | 0.20 | $6.8 \times 10^8$ | $2.8 \times 10^{14}$ |
| | 2 | | $7.4 \times 10^8$ | $1.6 \times 10^{10}$ |
| D | 1 | 0.10 | $6.0 \times 10^8$ | $3.8 \times 10^{15}$ |
| | 2 | | $6.0 \times 10^8$ | $1.1 \times 10^{10}$ |
| E(Control) | | | $>10^{16}$ | — |
| | | | $4.3 \times 10^{16}$ | — |

Conductivity of the soaked samples was better than the control but the ratio of soaked to unsoaked samples is poorer than in Example 6. This is thought to be because the 9/1 copolymer has fewer crosslinkable sites than the 3/2 copolymer.

Example 8

A solution of 4 g of the copolymer, made by the procedure described in Example 3, was prepared in 75 ml of water. 3 ml of a solution containing sodium p-tertoctylphenoxypolyethoxyethylsulfonate were added, and the pH adjusted with dilute acid. The solution was diluted to 100 ml and divided into 5 parts. To four of them were added varying amounts of glutaraldehyde (GDA) (25% solution in water) as shown in Table 3. The hardener additions were made just prior to coating. The solutions were coated with a doctor knife onto a poly(ethylene terephthalate) film subbed as described in previous Examples and were dried in a forced air tunnel dryer at 150°–155° F. for 5 minutes. The films were allowed to stand overnight. Two squares were cut from each, placed in a controlled humidity (25–30% RH) box overnight, and the resistivity of the films was determined as described earlier. One film of each pair was immersed in water at 19°–20° C. for 15 minutes, then air dried. Both samples of each set were then returned to the constant RH box and equilibrated overnight. All films were then read again. The uncoated subbed poly-(ethylene terephthalate) base described earlier served as the control. Results are shown in Table 3.

TABLE 3

| Coating | | Amount Hardener (ml) | Surface Resistivity ($\rho s$) OHMS | Surface Resistivity ($\rho s$) OHMS #1 Ctgs. Only Water Soaked |
|---|---|---|---|---|
| A | 1 | 0.78 | $4.4 \times 10^9$ | $6.0 \times 10^{10}$ |
|   | 2 |      | $3.9 \times 10^9$ | $1.9 \times 10^9$ |
| B | 1 | 0.39 | $2.2 \times 10^9$ | $1.8 \times 10^{10}$ |
|   | 2 |      | $2.4 \times 10^9$ | $1.7 \times 10^9$ |
| C | 1 | 0.20 | $1.9 \times 10^9$ | $1.7 \times 10^9$ |
|   | 2 |      | $1.6 \times 10^9$ | $1.7 \times 10^9$ |
| D | 1 | 0.10 | $3.6 \times 10^9$ | $7.5 \times 10^{10}$ |
|   | 2 |      | $1.8 \times 10^9$ | $1.7 \times 10^9$ |

Example 9

Example 8 was repeated with one exception: copolymer prepared in Example 4 was used instead of copolymer prepared in Example 3. The coatings were cloudy, appearing crystalline. Average resistivity, however, was only $3.9 \times 10^{12}$ ohms. Resistivity after soaking was practically unchanged, i.e., $3.3 \times 10^{12}$ ohms, even at the lowest glutaraldehyde level.

Example 10

0.197 g of gelatin was dissolved in 75 ml of water, 3.94 g of the copolymer prepared as described in Example 5 were dissolved in the above solution. To this was added 3 ml of a solution containing sodium-p-tert-octylphenoxypolye sulfonate and the pH was adjusted to 6.5. The solution was diluted to 100 ml. Four 20-ml aliquots were removed and to each was added varying amounts of formaldehyde hardener listed in the table below. The hardener additions were made just prior to coating. A 0.002 inch (0.0508 cm) coating of each solution was then made with a doctor knife on a poly(ethylene terephthalate) base, subbed as described in Example 6. The coatings were dried at 155° F. for 5 minutes.

Two squares were cut from each coating, equilibrated in a constant humidity (25%-30% RH) box, and the surface resistivity was measured. One sample of each pair was soaked in water for 15 minutes at room temperature and air dried. Both coatings of each pair were then returned to the constant humidity box and equilibrated overnight. All coatings were read again and the results are shown in the table below. The previously soaked samples were again soaked in 38°–39° C. water for 5 minutes and air dried. Both coatings of each pair were returned to the constant humidity box and equilibrated overnight. Surface resistivity ($\rho s$) measurements shown in the table below. The uncoated, subbed poly(ethylene terephthalate) base described above served as the control. Results are shown in Table 4.

TABLE 4

| Coating | | Amt. of Formaldehyde (ml) (37% Soln.) | Surface Resistivity ($\rho s$) ohms | Surface Resistivity ($\rho s$) Ohms #1 Coatings Only H$_2$O Soaked | |
|---|---|---|---|---|---|
|   |   |   |   | (Room Temp.) | 38°–39° C. |
| A | 1 | 0.53 | $3.7 \times 10^9$ | $3.5 \times 10^9$ | $4.2 \times 10^{11}$ |
|   | 2 | 0.53 | $4.4 \times 10^9$ | $7.1 \times 10^9$ | $9.3 \times 10^9$ |
| B | 1 | 0.20 | $1.0 \times 10^{10}$ | $1.1 \times 10^{10}$ | $1.1 \times 10^{14}$ |
|   | 2 | 0.20 | $4.1 \times 10^9$ | $7.1 \times 10^9$ | $7.1 \times 10^9$ |
| C | 1 | 0.13 | $4.0 \times 10^9$ | $3.9 \times 10^9$ | $2.8 \times 10^{12}$ |
|   | 2 | 0.13 | $2.7 \times 10^9$ | $4.0 \times 10^9$ | $4.5 \times 10^9$ |
| D | 1 | 0.065 | $0.2 \times 10^9$ | $7.1 \times 10^9$ | $7.2 \times 10^{12}$ |
|   | 2 | 0.065 | $2.1 \times 10^{10}$ | $3.4 \times 10^{10}$ | $3.3 \times 10^{10}$ |
| Control | | | $1.0 \times 10^{16}$ $>10^{15}$ | — | — |

The results show the polymer with 5% gelatin resists a water soak at room temperature and at 38°–39° C.

Example 11

A sodium styrenesulfonate/2-(amino)ethylmethacrylate (4/1) copolymer was prepared using the following procedure:

41 grams of sodium styrenesulfonate and 8.3 grams of 2-(amino)ethylmethacrylate.HCl (hydrochloride salt) were dissolved in 200 ml of water and the pH was adjusted to 3.5 with 1N sulfuric acid. The solution was N$_2$ sparged for 30 minutes and heated to 65° C. 1 gram of 4.4'-azobis(4-cyanovaleric acid) was added and the mixture heated at 65° C. for 4 hours with a continuous N$_2$ sparge. It was then poured into acetone, decanted, and methanol was added. The polymer was pulverized in a blender with fresh methanol, filtered, methanol-washed, and vacuum oven-dried to give the above identified copolymer.

Coatings were prepared as described in Example 8 with the following exceptions: copolymer prepared above was used instead of the copolymer prepared in Example 3 and the pH was adjusted to 6.5. Results showed no loss in conductivity after a room temperature water soak.

Example 12

A sodium styrenesulfonate/2-(amino)ethylmethacrylate (/1) monomer ratio) copolymer was prepared as described in Example 11 with the following exception: 37 grams of sodium styrenesulfonate and 3.31 grams of 2-(amino)ethylmethacrylate hydrochloride were used, and after adding the methanol the mixture was allowed to stand overnight.

Coatings were prepared as described in Example 11 with the following exceptions: copolymer prepared above was used and formaldehyde was added as cross-linking agent. pH was adjusted to 6.5.

The results showed little loss in conductivity even at the 3% formaldehyde level. Therefore, this copolymer coating could be used as a formaldehyde-crosslinkable antistatic layer.

Example 13

Example 11 was repeated with the following exception: copolymer described in Example 12 was used. The results showed no loss in conductivity even though the copolymer used had less 2-(amino)ethylmethacrylate monomer than that used in the previous example.

Example 14

A copolymer of 2-(amino)ethylmethacrylate with sodium vinylsulfonate was prepared by the following procedure:

152 grams of 25% sodiumvinylsulfonate aqueous solution was diluted with 50 ml of water in a mechanically stirred flask. 5.5 grams of 2-(amino)ethylmethacrylate.HCl were added and the pH adjusted to 3.5. 0.1 gram of disodium ethylenediamine tetraacetate was added, and the reaction mixture was $N_2$ sparged and heated to 65° C. over 30 minutes. 8 ml of 10 sodium bisulfite and 10 ml of 2% potassium persulfate were added followed by a $N_2$ sparge and stirring at 65° C. for 4 hours. The mixture was then poured into 1 liter of acetone and allowed to stand overnight. The oily product was separated by decantation. Agitation in a blender with methanol, filtering, and methanol washing gave the product, which was dried in a vacuum oven to give 43 grams of a white powder.

Coatings were prepared as described in Example 11 except that the copolymer described above was used.

The results showed a reasonable retention of conductivity in the water-soaked samples. Overall conductivity was lower, since vinylsulfonate polymers are less conductive than styrenesulfonate types.

Example 15

Coatings were made as described in Example 11 with the following exception: sodium styrenesulfonate/2-(amino)ethylmethacrylate (49/1) copolymer was used instead of the one used in Example 11. Four additional coatings were made with the above copolymer wherein the coating thickness was 0.005 inch thick instead of 0.001 inch. Surface resistivity measurements showed the coatings lost more conductivity upon soaking because of the low amine content in the polymer.

Example 16

A solution of 247 g of sodium styrenesulfonate and 30 g of a 35% aqueous solution of 2-(amino)ethylmethacrylate was prepared in 1200 ml of water. The pH was adjusted to 3.5 with 1N sulfuric acid. Disodium ethylenediamine tetraacetic acid (0.3 g) was added. The solution was nitrogen sparged and heated to 65° C. over one-half hour. Three grams of 4.4'-azobis(4-cyanovaleric acid) was added. The reaction mixture was heated at 65° C. with stirring and nitrogen sparging for 6 hours. The mixture was poured into a large volume of acetone. The acetone was decanted. The polymer was treated with methanol in a blender. The product was isolated by filtration, and was washed with methanol. Drying gave 244 grams (95%) of the product as a white solid.

Example 17

A solution of 400 g of the above prepared polymer was made in 5 kg of water to give a 7.4% by weight solution. To this was added 150 ml of a solution which consisted of 150 g of Triton X-200, 74 ml of ethanol and 770 g of distilled water. The pH was adjusted to 6.5 using dilute sodium hydroxide solution. Thirty-two ml of a 50% solution of glutaraldehyde was added. Coatings were made on gel subbed (both sides) 4 mil base using a laboratory bar coater. Coating quality was poor because the solution was too viscous. The solution was then diluted to give 4% total solids. Coatings were made at 50 feet per minute. Coating weights were calculated as 40 mg/square dm. The dryer was set at 65° C. with a dew point of 32° C.

The dried antistatic layer was then overcoated with an antihalation layer which consisted of gelatin, a polymeric latex, glyoxal hardener, and various dyes necessary for halation protection. This layer was applied at 85 mg/square dm in substantially the same way as the antistatic layer was applied. The antistatic layer was not disturbed by the gelatin layer, nor was the gelatin layer affected by the antistatic layer. On water soaking, the gelatin layer was observed to soften and blister. Aging of the coated film for about a month served to sufficiently harden the gelatin layer so that it was no longer affected by water. This is seen in the appended resistivity data.

| | Surface resistivity, ohms |
|---|---|
| Freshly coated | $1.1 \times 10^{10}$ |
| After 15 min room temperature water soak | $1.4 \times 10^{10}$ |
| After 5 min 40° C. water soak | $2.1 \times 10^{10}$ |
| Antihalation backed film without antistatic protection | $1.8 \times 10^{15}$ |

Example 18

The opposite side of the above coated base was then coated with a dye and gold/sulfur-sensitized silver chlorobromide emulsion typically used for phototypesetting films. The emulsion also was overcoated with a protective matte containing a gelatin layer typical for graphic arts products. The emulsion and overcoat were applied in a single pass from a two slot bar coater. Surface resistivities of the antistatic coated side were then read in the usual fashion.

| | Surface resistivity, ohms |
|---|---|
| Backing side of film, after emulsion coating on front side | $9.8 \times 10^{10}$ |

This coating has much lower surface resistivity than the uncoated base which is an indicator of excellent static protection.

We claim:

1. A photographic element comprising a support, a photosensitive layer on at least one side of the support, and an auxiliary layer, wherein said auxiliary layer is a layer selected from the group consisting of a backing layer on the side of the support opposite the photosensitive layer, and a subcoat layer, and comprises a conductive, crosslinkable, water-soluble, hydrophilic copolymer having monomer units consisting essentially of
   (a) a $SO_3M$ substituted ethylenically unsaturated monomer where M is $H^+$, $NH_4^+$, metal$^+$, or $N(R)_4^+$, where R is an alkyl group having 1-6 carbon atoms or an aryl group, and
   (b) an ethylenically unsaturated comonomer containing a primary or secondary amino group selected from the group consisting of

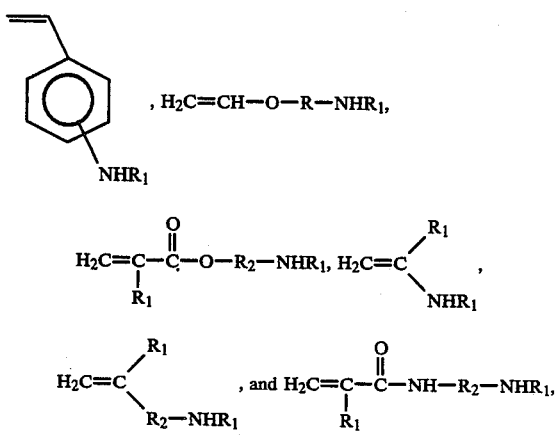

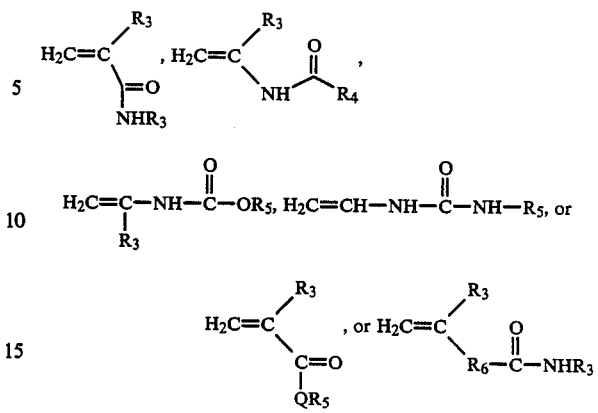

or acid salts thereof, where R is phenyl or alkyl of 1–4 carbon atoms, $R_1$ is H or alkyl of 1 to 6 carbon atoms $R_2$ is phenyl or alkyl of 1–12 carbon atoms, the molar ratio of (a) to (b) being 99:1 to 15:85, and optionally (c) another ethylenically unsaturated monomer containing essentially no free carboxyl groups, said copolymer crosslinked with a member selected from the group consisting of mono- and polyfunctional aldehydes, bisvinyl sulfones, polyfunctional aziridines, symmetrical triazines and diazines, α-diketones, active halogen compounds, epoxides, active olefins having two or more active bonds, blocked active olefins, halogen-substituted aldehyde acids and dialdehyde starches, and combinations thereof.

2. The photographic element of claim 1 wherein the photosensitive layer is photopolymer, diazo, vesicular image-forming, or electrostatic.

3. The photographic element of claim 1 wherein the photosensitive layer is a gelatino-silver halide emulsion.

4. The photographic element of claim 1 wherein the crosslinked antistatic layer is a subcoat.

5. The photographic element of claim 1 wherein the crosslinked antistatic layer is a backing layer on the side of the support opposite the photosensitive layer.

6. The photographic element of claim 1 wherein the support is poly(ethylene terephthalate).

7. The photographic element of claim 1 wherein the crosslinked antistatic layer has a coating weight of 0.25 mg/dm² to 100 mg/dm².

8. The photographic element of claim 1 wherein a polymer binder of low conductivity is applied with the antistatic polymer.

9. The photographic element of claim 8 wherein the polymer binder of low conductivity can be crosslinked to the antistatic polymer.

10. The photographic element of claim 9 wherein the polymer binder is gelatin.

11. The photographic element of claim 1 wherein a polymer binder or additive is applied with the antistatic polymer to reduce brittleness of the coating and eliminate cracking under high temperature curing conditions.

12. A photographic element according to claim 1 wherein the conductive, water-soluble copolymer has additional monomer units wherein monomer (c) is an ethylenically unsaturated compound taken from the group consisting of where $R_3$ is H or alkyl of 1–6 carbons, $R_4$ is H or a $C_1$–$C_{12}$ alkyl group, $R_5$ is alkyl of 1–12 carbon atoms, Q is $NR_3$ or O, and $R_6$ is phenyl or $C_1$–$C_{12}$ alkyl group.

13. A photographic element according to claim 1 wherein the conductive, crosslinkable, water-soluble, hydrophilic copolymer has the following formula

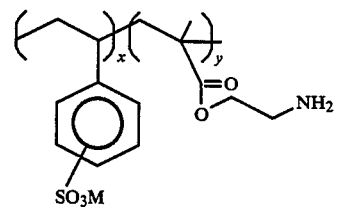

wherein Y is 1 to 85, X is 99 to 15 and M is selected from the group consisting of H+, NH$_4$+, metal+ and N(R)$_4$+ where R is an alkyl group having 1 to 6 carbon atoms or an aryl group.

14. A photographic film comprising a film support, a gelatino-silver halide emulsion layer on at least one side of the support, and a water-resistant antistatic auxiliary layer under said emulsion layer or on the opposite side of the support from said emulsion layer, which auxiliary layer comprises a crosslinked antistatic polymer prepared by reacting
a copolymer taken from the group consisting of a copolymer of a styrene sulfonate and vinyl amine ($H_2C=CH-NH_2$) having the formula:

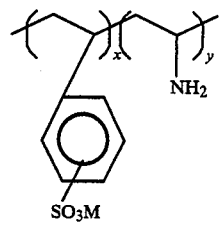

where x is 15–99% and y=85–1%, and M=H+, and NH$_4$+, metal+ or N(R)$_4$+ where R is an alkyl group having 1–6 carbon atoms or an aryl group, and a copolymer of 1 to 85% 2-(amino) ethyl methacrylate or acrylate and 99–15% a styrenesulfonate, these percentages being molar, with a crosslinking agent for gelatin selected from the group consisting of mono- and polyfunctional aldehydes bisvinyl sulfones, symmetrical triazines and diazines, polyfunctional aziridines, -diketones, active halogen compounds, epoxides, active olefins having two or more active bonds, blocked active olefins, halogen-substituted aldehyde acids and dialdehyde starches, and combinations thereof.

15. A photographic element comprising a support, a photosensitive layer on at least one side of the support, and an auxiliary layer, wherein said auxiliary layer is a layer selected from the group consisting of a backing layer on the side of the support opposite the photosensitive layer, and a subcoat layer, and comprises a conductive, crosslinkable, water-soluble, hydrophilic copolymer having monomer units consisting essentially of
  (a) an substituted ethylenically unsaturated monomer having an aromatic group to which is directly attached a $SO_3M$ group where M is $H^+$, $NH_3^+$, metal$^+$ or $N(R)_4^+$, where R is an alkyl group having 1-6 carbon atoms or an aryl group, and
  (b) an ethylenically unsaturated comonomer containing a primary or secondary amino group selected from the group consisting of

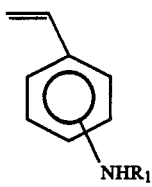, $H_2C=CH-O-R-NHR_1$,

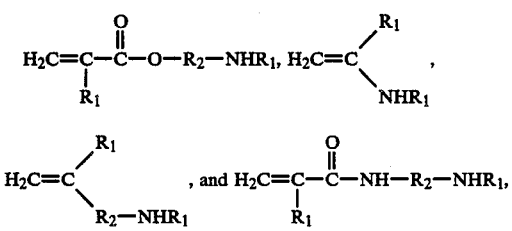

or acid salts thereof, where R is phenyl or alkyl of 1–4 carbon atoms, $R_2$ is phenyl or alkyl of 1–12 carbon atoms, $R_1$ is H or alkyl of 1 to 6 carbon atoms the molar ratio of (a) to (b) being 99:1 to 15:85, and optionally
  (c) another ethylenically unsaturated monomer containing essentially no free carboxyl groups, said copolymer crosslinked with a member selected from the group consisting of mono- and polyfunctional aldehydes, bisvinyl sulfones, polyfunctional aziridines, and symmetrical triazines and diazines, α-diketones, active halogen compounds, epoxides, active olefins having two or more active bonds, blocked active olefins, halogen-substituted aldehyde acids and dialdehyde starches, and combinations thereof.

16. The photographic element of claim 15 wherein the photosensitive layer is photopolymer, diazo, vesicular image-forming, or electrostatic.

17. The photographic element of claim 15 wherein the photosensitive layer is a gelatino-silver halide emulsion.

18. The photographic element of claim 15 wherein the crosslinked antistatic layer is a subcoat.

19. The photographic element of claim 15 wherein the crosslinked antistatic layer is a backing layer on the side of the support opposite the photosensitive layer.

20. The photographic element of claim 15 wherein the support is poly(ethylene terephthalate).

21. The photographic element of claim 15 wherein the crosslinked antistatic layer has a coating weight of 0.25 mg/dm$^2$ to 100 mg/dm$^2$.

22. The photographic element of claim 15 wherein a polymer binder of low conductivity is applied with the antistatic polymer.

23. The photographic element of claim 15 wherein the polymer binder of low conductivity can be crosslinked to the antistatic polymer.

24. The photographic element of claim 23 wherein the polymeric binder is gelatin.

25. The photographic element of claim 15 wherein a polymer binder or additive is applied with the antistatic polymer to reduce brittleness of the coating and eliminate cracking under high temperature curing conditions.

26. A photographic element according to claim 15 wherein the conductive, crosslinkable, water-soluble, hydrophilic copolymer has the following formula

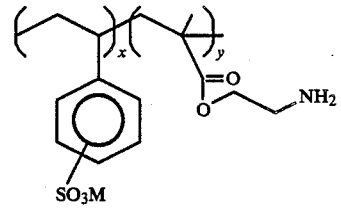

wherein Y is 1 to 85, X is 99 to 15 and M is selected from the group consisting of $H^+$, $NH_4^+$, metal$^+$ and $N(R)_4^+$ where R is an alkyl group having 1 to 6 carbon atoms or an aryl group.

* * * * *